(12) United States Patent
Collett et al.

(10) Patent No.: US 10,766,313 B2
(45) Date of Patent: Sep. 8, 2020

(54) TIRE TREADS HAVING TREAD ELEMENTS WITH INCLINED LEADING SIDES

(71) Applicants: Mark Collett, Simpsonville, SC (US); Francois Hottebart, Royat (FR)

(72) Inventors: Mark Collett, Simpsonville, SC (US); Francois Hottebart, Royat (FR)

(73) Assignee: Compagnie Generale des Etablissments Michelin, Clermont-Ferrand (FR)

( * ) Notice: Subject to any disclaimer, the term of this patent is extended or adjusted under 35 U.S.C. 154(b) by 585 days.

(21) Appl. No.: 15/321,558

(22) PCT Filed: Jun. 30, 2014

(86) PCT No.: PCT/US2014/044926
§ 371 (c)(1),
(2) Date: Dec. 22, 2016

(87) PCT Pub. No.: WO2016/003426
PCT Pub. Date: Jan. 7, 2016

(65) Prior Publication Data
US 2017/0157991 A1 Jun. 8, 2017

(51) Int. Cl.
*B60C 11/13* (2006.01)
*B60C 11/03* (2006.01)

(52) U.S. Cl.
CPC ........ *B60C 11/1307* (2013.01); *B60C 11/033* (2013.01); *B60C 11/0304* (2013.01); *B60C 11/1323* (2013.01); *B60C 2011/0358* (2013.01)

(58) Field of Classification Search
CPC B60C 11/1307; B60C 11/0304; B60C 11/033
See application file for complete search history.

(56) References Cited

U.S. PATENT DOCUMENTS 3,768,535 A 10/1973 Holden
3,980,118 A 9/1976 Kinas
(Continued)

FOREIGN PATENT DOCUMENTS

CN 101578186 A 11/2009
DE 2908219 A1 9/1979
(Continued)

OTHER PUBLICATIONS

PCT/US2014/044926 International Search Report and Written Opinion dated Mar. 6, 2015, 34 pages.
(Continued)

*Primary Examiner* — Jacob T Minskey
*Assistant Examiner* — Melody Tsui
(74) *Attorney, Agent, or Firm* — Hahn Loeser & Parks LLP

(57) ABSTRACT

Tire tread including one or more tread elements arranged between a pair of discontinuities extending in a direction of the tread width. The first and second longitudinally-spaced sides of the tread element are spaced-apart in a direction of the tread length. The first longitudinally-spaced side is oriented at an average first-side angle relative to the depthwise direction of the tread and the second longitudinally-spaced side is oriented at an average second-side angle relative to the depthwise direction of the tread. An average inclination angle comprising a combined average of the average first side-angle and the second side-angle for all of the one or more tread elements along the first and second longitudinally-spaced sides is substantially greater than zero.

14 Claims, 4 Drawing Sheets

(56) References Cited

U.S. PATENT DOCUMENTS

| | | | |
|---|---|---|---|
| 4,284,115 A | 8/1981 | Ohnishi | |
| 5,200,008 A | 4/1993 | Enterline et al. | |
| 6,382,283 B1 | 5/2002 | Caretta | |
| 6,408,910 B1 | 6/2002 | Lagnier et al. | |
| 9,162,533 B2 | 10/2015 | Berger et al. | |
| 2002/0166613 A1 | 11/2002 | Radulescu | |
| 2010/0018619 A1 | 1/2010 | Matsumoto | |
| 2011/0155293 A1 | 6/2011 | Berger et al. | |
| 2017/0157991 A1 | 6/2017 | Collett et al. | |
| 2018/0022166 A1 | 1/2018 | Neau et al. | |

FOREIGN PATENT DOCUMENTS

| | | | | |
|---|---|---|---|---|
| GB | 2017597 A | | 10/1979 | |
| JP | S63-068406 A | | 3/1988 | |
| JP | H03-295706 A | | 12/1991 | |
| JP | H04-137903 U | | 12/1992 | |
| JP | H05-169918 A | | 7/1993 | |
| JP | 05338418 A | * | 12/1993 | ......... B60C 11/1281 |
| JP | 05338418 A | | 12/1993 | |
| JP | H08-230413 A | | 9/1996 | |
| JP | H11-334317 A | | 12/1999 | |
| JP | 2000-094907 A | | 4/2000 | |
| JP | 2000094907 A | * | 4/2000 | |
| JP | 2001-233019 A | | 8/2001 | |
| JP | 2002-219908 A | | 8/2002 | |
| JP | 2002225512 A | | 8/2002 | |
| JP | 2003011619 A | | 1/2003 | |
| JP | 2004314758 A | | 11/2004 | |
| WO | 9854009 A1 | | 12/1998 | |
| WO | 2010000797 A1 | | 1/2010 | |
| WO | 2013148355 A1 | | 10/2013 | |
| WO | 2015190391 A1 | | 12/2015 | |
| WO | 2016003435 A1 | | 1/2016 | |
| WO | 2016012128 A1 | | 1/2016 | |

OTHER PUBLICATIONS

PCT/US2015/058426 International Search Report and Written Opinion dated Feb. 5, 2016, 37 pages.

PCT/US2016/059791 International Search Report and Written Opinion dated Jul. 20, 2017, 14 pages.

PCT/US2016/064240 International Search Report and Written Opinion dated Aug. 3, 2017, 15 pages.

PCT/US2017/059053 International Search Report and Written Opinion dated Feb. 1, 2018, 14 pages.

PCT/US2017/063794 International Search Report and Written Opinion dated Feb. 19, 2018, 62 pages.

* cited by examiner

TIRE TREADS HAVING TREAD ELEMENTS WITH INCLINED LEADING SIDES

BACKGROUND OF THE INVENTION

Field of the Invention

This invention relates generally to tire treads having one or more tread elements with inclined leading-trailing sides, and tires having the same.

Description of the Related Art

Tire treads are known to include a pattern of voids and/or discontinuities arranged along an outer, ground-engaging side of the tread to provide sufficient traction and handling performance during particular operating conditions. For example, grooves provide void into which water, mud, or other environmental materials may be diverted to better allow the tread surface to engage a tire operating surface (that is, a surface upon with the tire operates, such as a road or ground surface). By providing the pattern of voids/discontinuities, tread elements are formed along the tread, where the outer portion of said elements are arranged along the outer side of the tread to provide traction as the outer side engages the tire operating surface.

It is well known that the tire tread wears during tire operation due to the generation of slip between the outer side of the tread and the tire operating surface. This not only occurs when the rolling direction of the tire is biased relative to the direction of vehicle travel to generate lateral traction forces, such as when a vehicle is changing direction during turning or cornering maneuvers, but also when the rolling direction of a tire is arranged in the direction of vehicle travel to generate longitudinal traction forces. Because slip occurs even when a tire is traveling in a straight line, such as when under torque, wear also occurs when the tire is traveling in a straight line under torque. Therefore, there is a desire to reduce the rate of tread wear and/or the generation of irregular wear during tire operation because there is the desire to increase the usable life of tires.

SUMMARY OF THE INVENTION

Particular embodiments of the invention include tire tread, tires having such treads, and methods of using the tire tread. In particular embodiments, the tire tread includes a length, a width, and a tread thickness, the thickness extending inward from an outer, ground-engaging side in a direction normal to both the width and length of the tread. The width extends laterally in a direction transverse to the tread thickness and to the length of the tread, the width extending laterally between a first lateral side and a second lateral side of the tread. The tread further includes one or more tread elements, each of the one or more tread elements being arranged between a pair of discontinuities extending in a direction of the tread width. One of the pair of discontinuities is arranged adjacent to a first longitudinally-spaced side of the tread element and the other of the pair of discontinuities is arranged adjacent to the a second longitudinally-spaced side of the tread element such that the pair of discontinuities and the first and second longitudinally-spaced sides of the tread element are spaced-apart in a direction of the tread length to define a length of the tread element. The first longitudinally-spaced side is a leading side of the tread element and the second longitudinally-spaced side is a trailing side of the tread element, where leading side is configured to enter a tire footprint before the trailing side. The one or more tread elements are arranged along the length of the tread. For each of the one or more tread elements, the first longitudinally-spaced side is oriented at an average first-side angle relative to the depthwise direction of the tread and the second longitudinally-spaced side is oriented at an average second-side angle relative to the depthwise direction of the tread. The tread is configured to rotate in a direction of rotation of a tire. The direction of rotation comprises one of opposing directions of the tread length, such that a positive average first-side angle and a positive second-side angle orientation is obtained when the respective first longitudinally-spaced side and the second longitudinally-spaced side are each increasingly inclined in the direction of tread rotation as each respective first longitudinally-spaced side and second longitudinally-spaced side extend in a direction of the tread thickness towards the outer, ground-engaging side of the tread. For the tread, an average inclination angle comprising a combined average of the average first side-angle and the second side-angle for all of the one or more tread elements along the first and second longitudinally-spaced sides is substantially greater than zero.

In other embodiments, the invention comprises a tire having said tread. In yet other embodiments, the invention comprises methods of reducing tread wear using said tread.

The foregoing and other objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Various embodiments of the invention described herein provide a tire tread exhibiting improved wear characteristics when the tire tread is exposed to a driving torque. Particular embodiments of the invention comprise a tire including any such tire tread.

Figure 5:
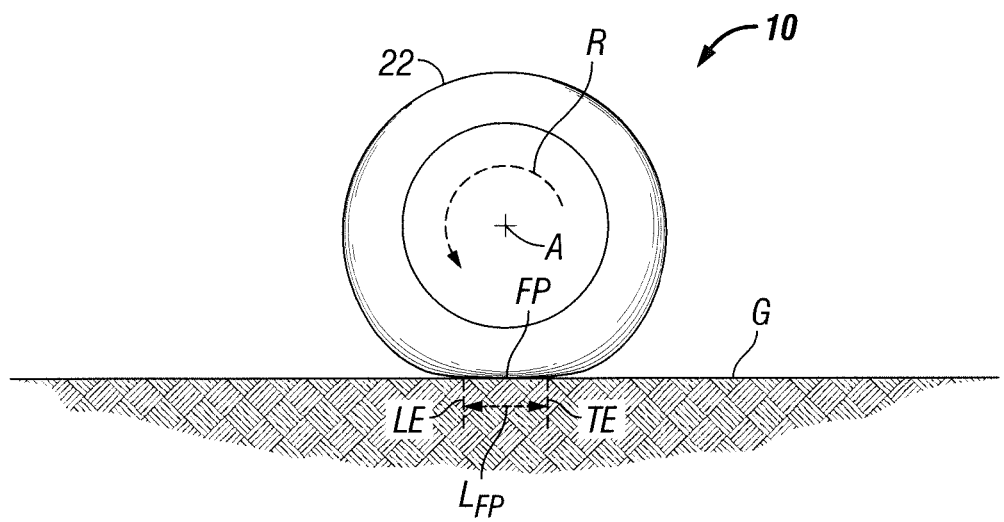
FIG. 5 is a side view of a tire arranged along a ground surface, in accordance with an embodiment.
Figure 6:
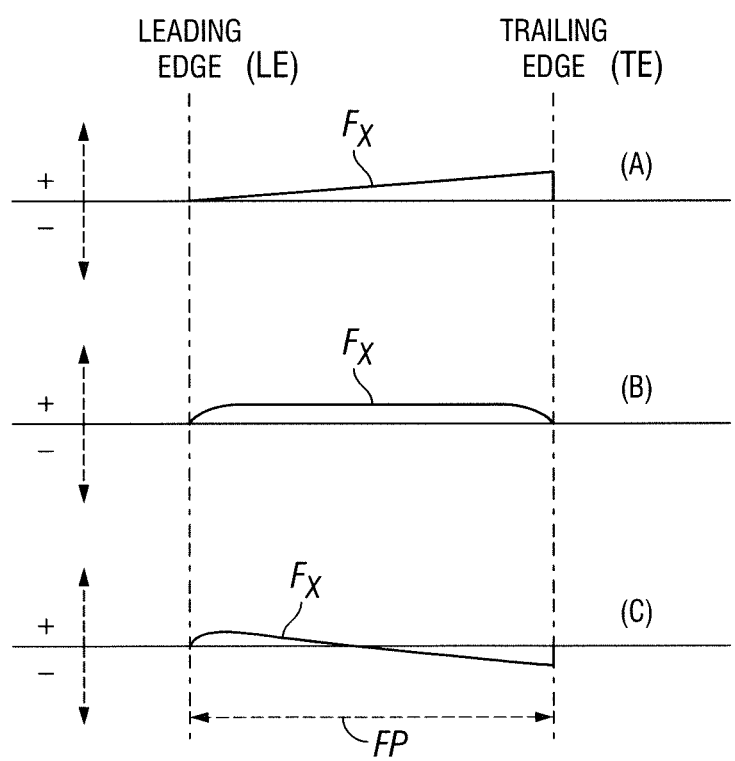
FIG. 6 is a chart showing the variation in longitudinal forces generated in a tire footprint for (A) a prior art tire under torque, (B) a tire including the inventive features shown in FIG. 3 under torque, and (C) the tire of (B) in a free rolling condition.
Figure 7:
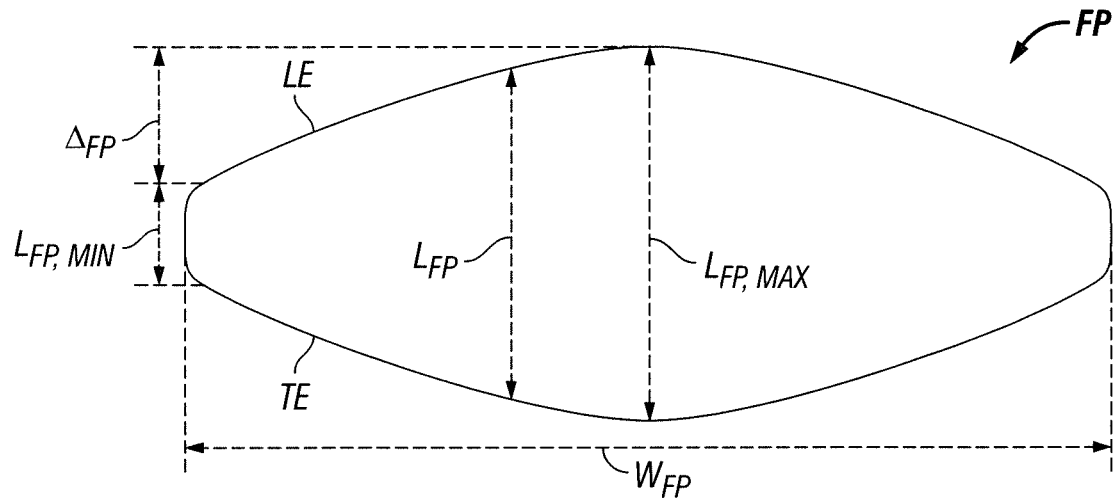
FIG. 7 is a top view of a tire footprint in an exemplary arrangement.

As noted above, slip between the tire tread and the tire operating surface generates tread wear. A tire footprint is described as a portion of the tire tread that contacts the tire operating surface (such as the ground, for example) during tire operation. A footprint is also referred to as a "contact area" or "contact patch." As such, when a tire rolls, as exemplarily shown in FIG. 5, the outer, ground-engaging side 22 of a tire tread rolls into contact with the tire operating surface G at a leading edge LE of a tire footprint FP, where a portion of the tread rolls into and enters the footprint, while the ground-engaging side rolls out of contact with the tire operating surface at a trailing edge TE of the tire footprint, where a portion of the tread rolls out of and exits the footprint. With reference to FIG. 7, an exemplary footprint is shown. In particular instances, as the tread exits the footprint, slip between the tread and the tire operating surface occurs, which leads to the generation of tread wear. At the trailing edge of the footprint (that is, at the furthest-most edge of the footprint from which the tread exits), high shear strains are present, which leads to high tangential stresses—represented by elevated longitudinal forces. This is generally represented in plot (A) in FIG. 6, showing the presence of longitudinal forces along a length of an exemplary tire footprint. Additionally, at the trailing edge, vertical pressure acting on the tread decreases to zero, which leads to the generation of slip, since as the tread exits the footprint, slip occurs when the ratio between high tangential stresses and decreasing normal pressure reaches a traction limit, which is typically around 1 for dry conditions. This results in undesired tread wear, which may comprise excessive rates of wear and/or irregular wear. For example, irregular wear includes heel and toe wear, where the leading edge of the tread element wears to a rounded profile and the trailing edge of the tread element wears to an elongated, pointed profile, whereby the leading edge resembles a heel and the trailing edge a toe.

By virtue of employing the inventive tread features described herein, which includes selectively inclining leading and/or trailing sides (also referred to as fore-aft sides) of certain tread elements, as discussed below, a reduction in slip is achieved, which therefore reduces tread wear, when a tire is operating under a driving torque, which may comprise an accelerating torque, for example. This is reduction in slip is accomplished by reducing at the trailing edge the shear strain needed to achieve a desired longitudinal force with a tread element during tire operation. As a result, with reference to plot (B) in FIG. 6, showing a reduction of longitudinal force at the trailing edge of an exemplary tire footprint. These improvements were realized with on-vehicle testing, where a test driver compared different tires each characterized as having leading and trailing sides with average inclination angles of 15 degrees and 0 degrees, respectively. The tests were conducted on a front-wheel compact car on a wear circuit approximating typical driving conditions. Upon comparing the front tires from each test, the tires having an average first/second-side angle of 15 degrees achieved a 25% wear improvement over the tires having an average first/second-side angle of zero degrees.

It is noted that the leading and trailing sides of a tread element extend at least partially in a direction of the tread thickness and in a direction of the tread width, where the leading and trailing sides are spaced-apart to form a length of the tread element. The leading side is arranged before the trailing side in a direction of the tire rotation, such that the leading side enters a tire footprint before the trailing side. The leading side is referred to herein as a first longitudinally-spaced side, and the trailing side is referred to herein as a second longitudinally-spaced side. A tread element, as used herein, refers to a tread block or lug or a tread rib, where the length of the tread element is defined by a pair of opposing discontinuities spaced-apart in a direction of the tread length, where one of the discontinuities is arranged along the first longitudinally-spaced side of the tread element and the other of the pair of discontinuities is arranged along the second longitudinally-spaced side of the tread element.

Each discontinuity of the pair of discontinuities may comprise any desired discontinuity, such as a sipe or a groove, for example. In particular embodiments, when the tread element forms a rib, the tread element (and therefore the rib) extends substantially the full length of the tread, whereby the tread element length (and therefore the rib length) extends in a direction of the tread length (a longitudinal direction of the tread), such that when the tread is arranged around a tire, the rib is arranged in a circumferential direction of the tire. In other embodiments, a plurality of tread elements may be arranged to form a rib. For any rib, the rib length may extend along a linear path (prior to installation on a tire, such as a retread), a constant radius curvilinear path (where the path extends in one direction around a tire), or an undulating non-linear path, which is a laterally undulating path (that is, where the path alternates back and forth in a direction of the tread width as the path extends in a direction of the tread length). It is appreciated that a tread element may have a width that is equal to or less than the width of the tread. When the tread element width is equal to a width of the tread, the width of the tread element is bounded or defined by the opposing lateral sides of the tread width. When the tread element width is less than the tread width, the width of each tread element is defined or bounded by a pair of discontinuities or a discontinuity and a lateral side of the tread.

As mentioned above, a discontinuity may comprise a sipe or a groove. A sipe comprises a slit or laceration or a narrow groove generally having a molded void width or thickness of 0.5 to 1.2 mm or less or otherwise configured, such that opposing sides of the sipe defining the sipe width or thickness contact or close during tire operation, such as when the sipe is arranged within a tire footprint. The molded widths of the sipes increase upon tire inflation, which results in upwards of approximately 0.2 mm in additional width, where 0.5 to 1.2 mm molded widths result in approximately 0.7 to 1.5 mm inflated widths. A groove has a width or thickness greater than that of a sipe, and is configured to remain open during tire operation, such as when the groove is arranged within a tire footprint to receive and evacuate water, snow, mud, or other environmental materials through which the tire is traveling.

It is appreciated that any discontinuity extends into the tread thickness by any desired depth, but generally at least 2 mm in particular embodiments. The discontinuity also has a length extending at least partially in a direction of the tread width, and partially or fully across the width of any tread element. It is appreciated that the length of the discontinuity may extend entirely or partially in the direction of the tread width (that is, in a direction normal to the tread length). When extending partially in the direction of the tread width, the length of the discontinuity extends in both the direction of the tread width and the direction of the tread length, such that the discontinuity length extends along a path having a vector extending in a direction of the tread width and a vector extending in a direction of the tread length. It is also appreciated that the length of the discontinuity may extend along any desired path, whether a linear or non-linear path. A non-linear path includes curvilinear and undulating paths. An undulating path extends back and forth, in an alternating manner, whether in linear or non-linear paths.

It is appreciated that any tread discussed herein may be arranged along a tire, or may be formed separately from a tire as a tire component for later installation on a tire carcass, in accordance with any technique or process known to one of ordinary skill in the art. For example, the treads discussed and referenced herein may be molded with a new, original tire, or may be formed as a retread for later installation upon a used tire carcass during retreading operations. Therefore, when referencing the tire tread, a longitudinal direction of the tire tread is synonymous with a circumferential direction of the tire when the tread is installed on a tire. Likewise, a direction of the tread width is synonymous with an axial direction of the tire or a direction of the tire width when the tread is installed on a tire. Finally, a direction of the tread thickness is synonymous with a radial direction of the tire when the tread is installed on a tire. It is understood that the inventive tread may be employed by any known tire, which may comprise a pneumatic or non-pneumatic tire, for example.

It is appreciated that any of the tread features discussed herein may be formed into a tire tread by any desired method, which may comprise any manual or automated process. For example, the treads may be molded, where any or all discontinuities therein may be molded with the tread or later cut into the tread using any manual or automated process. It is also appreciated that any one or both of the pair of opposing discontinuities may be originally formed along, and in fluid communication with, the outer, ground-engaging side of the tread, or may be submerged below the outer, ground-engaging side of the tread, to later form a tread element after a thickness of the tread has been worn or otherwise removed during the life of the tire.

In prior art tires, not incorporating the inventive tread features described herein, when applying a driving torque to drive or accelerate a vehicle, with reference to representative plot (A) in FIG. 6, a positive, driving longitudinal force Fx is generated at the trailing edge TE of a footprint FP through shear strain. By employing the improved treads described herein, with reference to a representative plot (B) in FIG. 6, when applying a driving torque, such as to accelerate, the longitudinal force Fx at the trailing edge TE of the footprint FP is reduced or eliminated. It is noted that the longitudinal force is reduced by a fixed value based upon the inclination angle selected for the leading and trailing sides of the one or more tread elements, which may, for the tire, result in the reduction or elimination of the longitudinal force at the trailing edge of the tire footprint. In doing so, it is appreciated that the longitudinal force may even be reduced below a zero value, which would then result in a negative longitudinal force, which induces a braking force on the tire. This would occur when a longitudinal force being applied to a tire, or a portion of a tire tread spaced apart from the maximum length of a sufficiently rounded footprint (see discussion below), is less than the reduction in longitudinal force generated by the inclination angle. This is represented in plot (C) of FIG. 6, where the longitudinal force Fx at the trailing edge TE of an exemplary tire footprint is reduced to a value below zero, which therefore operates as a braking force. Therefore, when a tire or a portion of a tire tread incorporating the inventive tread features described herein is operated at longitudinal force levels below the level created by the inclination angle, a negative longitudinal force (i.e., braking force) arises at the trailing edge of the footprint, which results in tread wear, of which may occur as elevated wear rates or as irregular wear, such as in the form of heel and toe wear.

It is appreciated that the outer, ground-engaging side of a tire tread may form a footprint that is more or less rounded. A footprint is the contact area between the tire tread and a tire operating surface, such as a road, ground, or any other surface upon which the tire engages during vehicle operation. The shape or lateral profile of a footprint be more or less rounded as the footprint extends widthwise from a longitudinal center of the footprint to each of the lateral sides of the footprint, which also extends in a lateral direction of the tire tread. A tire footprint is said to have a length, extending in a direction transverse (that is, perpendicularly) to the lateral direction of the footprint. Commonly, the length of the footprint decreases to its shortest lengths nearest the lateral sides of the footprint. The greater the change in length from a maximum length to a minimum length, for a footprint of a given width, the rounder the footprint. The shape or lateral profile of the footprint is dependent upon many variables, including without limitation, the stiffness of a tire's construction, tire inflation pressure, and the roundness of a lateral profile of the outer, ground-engaging side of the tire tread. With regard to the lateral profile of the outer, ground-engaging side, the lateral profile may be more or less rounded as the tread extends widthwise from a center of the tread to each of the lateral sides of the tread. In other words, in lieu of the outer, ground-engaging side of the tread being cylindrical in shape, the lateral sides of the tread experience a drop in outer diameter (or radius) relative a widthwise centerline of the tread.

It has been observed, that for rounder footprints, the longitudinal force generated by the tread decreases in areas of the footprint where the footprint length is reduced, that is, reduced from a maximum length. It is appreciated that any such reduction in longitudinal force may result in a negative longitudinal force, which is a braking force. Because the reduction in longitudinal force is fixed for a particular positive inclination of the leading and trailing sides of a tread element, selection of the positive inclination angle of any leading and trailing side of a tread element should take into consideration the roundness of the footprint, since for rounder footprints, the selection of a particular positive inclination angle for a leading and trailing side of the tread element may result in significant braking forces being generated by portions of the tread spaced laterally from a maximum footprint length, which would increase tire wear or generate irregular wear, such as in the form of heel and toe wear, and be counterproductive to the intended result of reducing tread wear. Upon further consideration, it is appreciated that the positive inclination angles for each of the leading and trailing sides of a tread element may be limited to tires having less round footprints.

Accordingly, particular embodiments of the invention comprise methods of reducing tread wear on a tire. One step includes providing a tread, which may comprise any tire tread described or contemplated herein, having one or more tread elements characterized as having an average inclination angle substantially greater than zero. In certain variations, for a tire having a particular footprint, an average inclination angle for any tread element is selected that is lower than an average inclination angle otherwise selected for a tire having a less round footprint. In other variations, for a tire having a particular footprint, the average inclination angle is selected which is higher than an average inclination angle otherwise selected for a tire having a rounder footprint. In other embodiments of such methods, for a tire intended to operate under a particular driving torque, the average inclination angle is selected that is lower than an average inclination angle otherwise selected for a tire operating under a greater driving torque. In other embodiments, for a tire intended to operate under a particular driving torque, the average inclination angle is selected that is higher than an average inclination angle otherwise selected for a tire operating under a lower driving torque. In any such methods, a lower average inclination angle is selected, or more generally an average inclination angle is selected, for a tire tread having a less round footprint, such as those described below having limited differences in lengths (or associated with tires having limited shoulder drops) to reduce or avoid an increase in heel and toe wear along the tire tread. In other words, by employing the average inclination angles as described herein (that is, where leading and trailing sides have particular average inclination angles) on tires of limited roundness (in the footprint), not only are wear rates reduced, but also heel and toe wear is reduced or an increase avoided but-for said angles being employed on tires having rounder footprints.

Particular embodiments of the tires and methods discussed above will now be described in further detail below in association with the figures filed herewith exemplifying the performance of the methods in association with particular embodiments of the tires.

Figure 1:
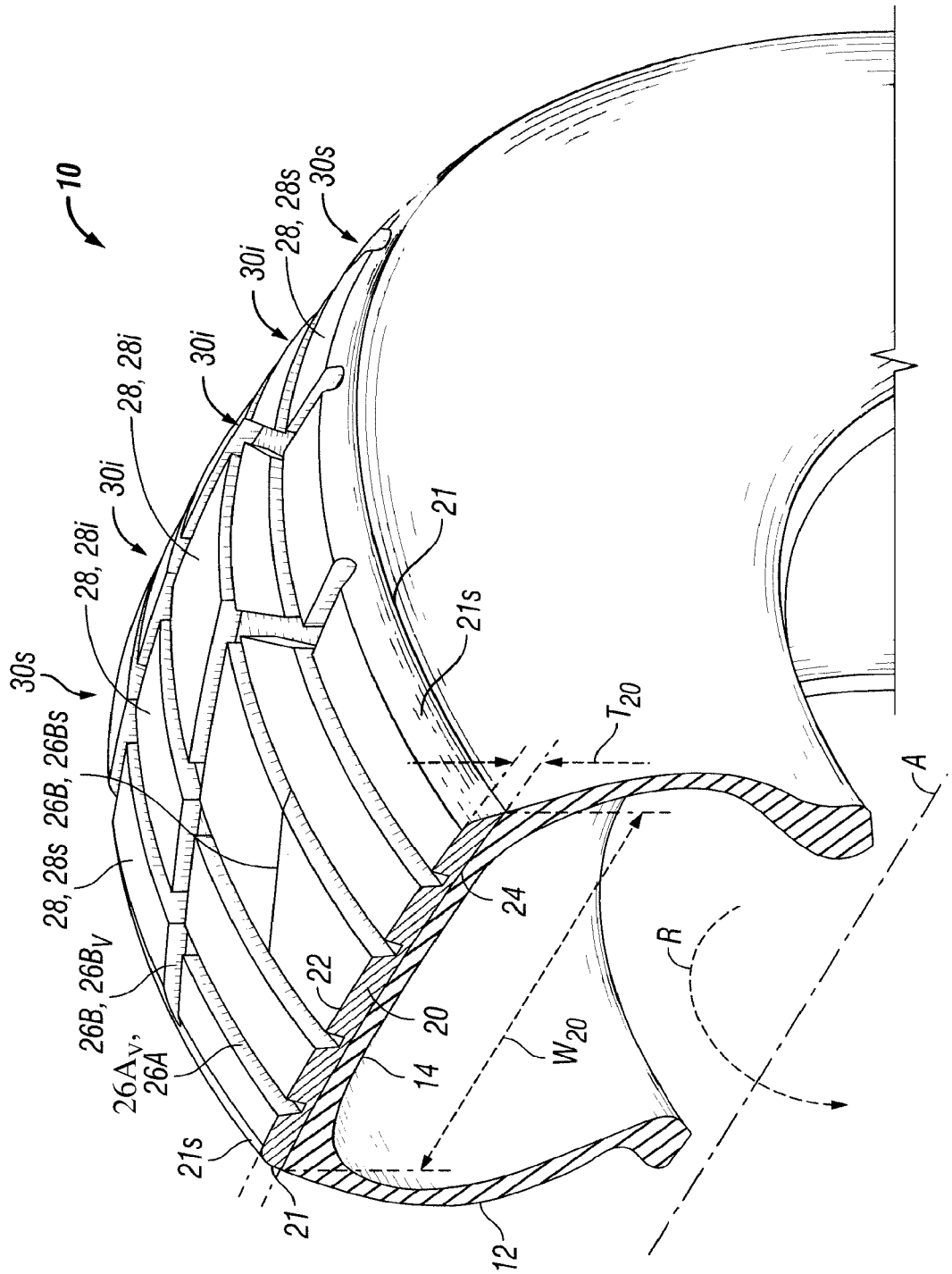
FIG. 1 is a perspective, partial cutaway view of a tire, in accordance with an embodiment.
Figure 2:
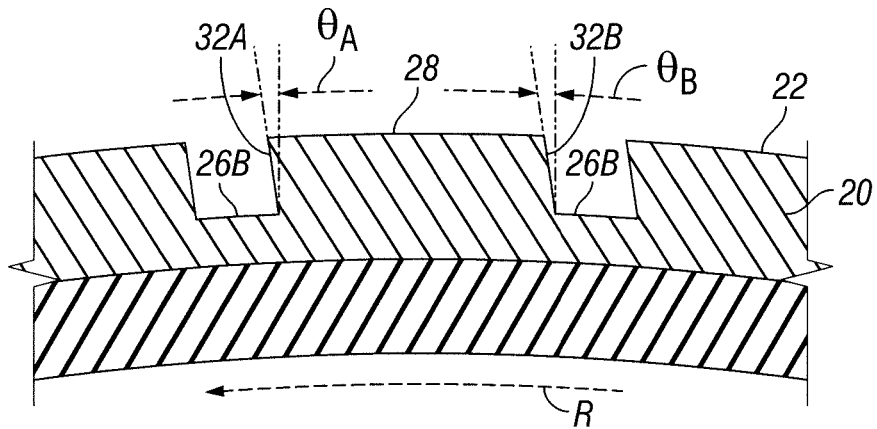
FIG. 2 is a partial side view of the tire tread shown in FIG. 1.
Figure 3:
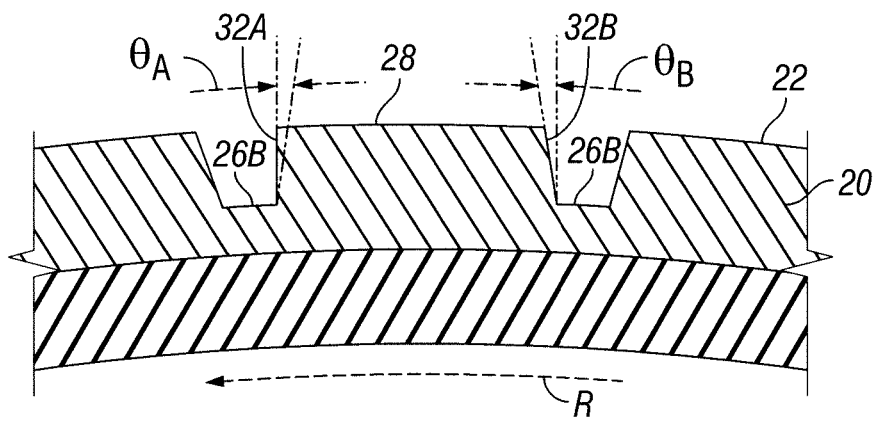
FIG. 3 is a partial side view of a prior art tire tread.

With reference to FIGS. 1 and 2, a tire 10 according to an exemplary embodiment of the present invention is shown. The tire 10 comprises a pneumatic tire having a pair of sidewalls 12 each extending radially outward from a rotational axis A of the tire to a central portion 14 of the tire 10. The central portion 14 of the tire is annular in shape, and includes a tread 20 having a thickness $T_{20}$ extending in a radial direction of the tire (relative a rotational axis of the tire) from an outer, ground-engaging side 22 of the tread to a bottom side 24 for attachment and bonding to the tire. The tread also has a width $W_{20}$ extending in a lateral direction ("laterally") between the pair of opposing, lateral sides 21 comprising a first lateral side and a second lateral side of the tread each arranged adjacent to one of the sidewalls 12. The tread also has a length $L_{20}$ extending circumferentially around the tire. It can be said that the width extends laterally in a direction transverse to the tread thickness $T_{20}$ and to a length $L_{20}$ of the tread, which can be said to extend longitudinally in a circumferential direction of the tire. In summary, the tread has a length, a width, and a tread thickness, the thickness extending inward from an outer, ground-engaging side in a direction normal to both the width and length of the tread, which is also referred to as a depthwise direction of the tread. The tread also includes a pair of shoulders $21_S$ forming a transition between the outer, ground-engaging side 22 and each lateral side 21 of the tread 20. While the tread is shown to form a portion of a tire, in other embodiments, the tread may be separate from the tire, such as when the tread is formed prior to being applied to a tire during retreading operations.

Figure 4:
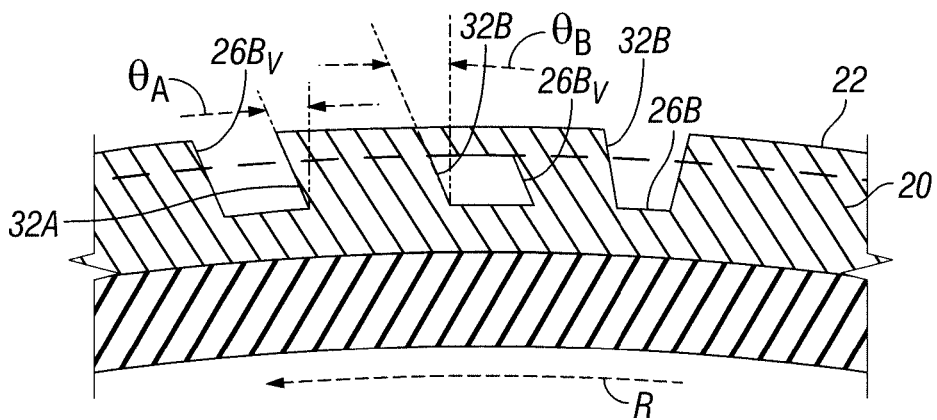
FIG. 4 is a partial side view of an alternative embodiment of the tire tread shown in FIG. 2.

With regard to the ground-engaging side 22 of the tread 20, the tread shown in FIGS. 1 and 2 to include a plurality of discontinuities 26. In the embodiment shown, discontinuities 26 comprise voids $26A_v$, $26B_v$ forming grooves and sipes $26B_S$. Moreover, discontinuities $26A_v$ comprise longitudinal grooves having a length extending in a direction of the tread length, which is in a circumferential direction C of the tire, while discontinuities $26B_v$, $26B_S$ comprise lateral grooves and lateral sipes, respectively, each having a length extending in a direction of the tread width $W_{20}$, which is in an axial direction A of the tire. Each discontinuity 26 also has a depth $D_{26}$ extending into the tread thickness $T_{20}$ from the outer, ground-engaging side 22, which is also shown to be in a radial direction R of the tire. It is appreciated that, in particular embodiments, such as is shown in one exemplary embodiment in FIG. 4, the outer, ground engaging side 22 from which any discontinuity extends may be obtained after a thickness of the tread has been worn to reach or expose a submerged discontinuity $26B_v$. A submerged discontinuity may comprise any discontinuity contemplated herein, including a groove or a sipe, for example.

The discontinuities together with longitudinally-spaced sides define a plurality of tread elements comprising tread blocks or lugs. In the embodiment shown in FIGS. 1 and 2, each of the one or more tread elements 28 are arranged between a pair of discontinuities $26B_v$ extending in a direction of the tread width $W_{20}$. In the embodiment shown, the pair of discontinuities 26B comprise a pair of lateral grooves $26B_v$ or a lateral groove $26B_v$ and a lateral sipe $26B_S$, but may comprise any combination of any discontinuity contemplated herein. In any event, one of the pair of discontinuities 26B, which is also referred to as a first discontinuity, is arranged adjacent to a first longitudinally-spaced side 32A of the tread element, while the other of the pair of discontinuities 26B, which may be referred to as a second discontinuity, is arranged adjacent to the a second longitudinally-spaced side 32B of the tread element such that the pair of discontinuities and the first and second longitudinally-spaced sides of the tread element are spaced-apart in a direction of the tread length $L_{20}$ to define a length $L_{28}$ of the tread element. The first longitudinally-spaced side 32A of the tread element is a leading side of the tread element, which enters a footprint before a trailing side of the tread element, which is the second longitudinally-spaced side 32B.

In the embodiment shown in FIG. 1, the one or more tread elements 28 comprise a plurality of shoulder tread elements 28s and a plurality of intermediate tread elements 28i. The plurality of shoulder tread elements 28s comprise one or more first shoulder tread elements arranged along the first lateral side 21 of the tread and one or more second shoulder tread elements arranged along the second lateral side 21 of the tread. The plurality of intermediate tread elements 28i are arranged between the first and second shoulder tread elements 28s, where a plurality of discontinuities 26A (comprising longitudinal grooves in the embodiment shown) separate the plurality of first and second shoulder tread elements and the intermediate tread elements.

In a particular embodiment shown in FIGS. 1 and 2, the one or more tread elements 28 comprise a plurality of tread elements arranged in a direction of the tread length $L_{20}$ in a spaced-apart arrangement to form one or more ribs 30. When the tread is arranged on a tire 10, the rib extends in a circumferential direction C of the tire. In particular embodiments, a rib 30 can be described as an array of tread elements 28 arranged in a direction of the tread length. It is appreciated that a rib may comprise any known rib. For example, a rib may extend partially or fully along the length of the tread, and may extend partially or fully in the direction of the tread length, such that, in particular embodiments a rib extends annularly around the tire. By further example, a rib may be said to have a length extending in a direction of the tread length, where the rib extends along a linear path, or a constant radius curvilinear path when arranged along tire, or an undulating non-linear curve alternating back and forth in alternating directions of the tread width.

With continued reference to the embodiment in FIG. 1, the tread elements 28 are arranged into one of five (5) different ribs 30 comprising shoulder ribs 30s and intermediate ribs 30i, where each rib comprises an array of tread elements 28 arranged to extend circumferentially substantially around the tire in a direction of the tread length. The each of the pair of shoulder ribs 30s are bounded by a lateral side 21 of the tread width $W_{20}$ and a discontinuity 26A, which comprises a longitudinal groove in the embodiment shown. Intermediate ribs $30_i$ are bounded on both sides by a pair of spaced-apart longitudinal discontinuities 26B, which comprise longitudinal grooves or sipes in the embodiment shown. In the embodiment shown in FIG. 1, it can said that the one or more first shoulder tread elements 28s form a first shoulder rib 30s and the one or more second shoulder tread elements 28s form a second shoulder rib 30s. While FIG. 1 illustrates a 5-rib tire, it is to be appreciated that the methods described herein can be utilized with tires having more or less ribs than tire 10. Further, it is appreciated that in other embodiments, one or more tread elements are arranged to provide a non-rib tread, where no ribs are formed with the one or more tread elements.

With reference the embodiment shown in FIGS. 1 and 2, for each tread element 28, both the first and second longitudinally-spaced sides 32A, 32B extend in a direction of the tread thickness $T_{20}$, where, for each of the one or more tread elements 28, the first longitudinal side 32A is oriented at an average first-side angle $\theta_A$ (inclination angle) relative to the depthwise direction of the tread (that is, in a direction of the tread thickness) and the second longitudinal side 32B is oriented at an average second-side angle $\theta_B$ (inclination angle) relative to the depthwise direction of the tread. These average first-side and second-side angles $\theta_A$, $\theta_B$ are each taken as an average of the corresponding angle over the full height $H_{32}$ of the corresponding first and second longitudinal-spaced side 32A, 32B along the full length $L_{32}$ of the corresponding first and second longitudinal-spaced side for a tread element. It is further noted that where the tread 20 is configured to rotate in a direction of rotation R comprising one of opposing directions of the tread length, a positive average first-side angle $\theta_A$ orientation and a positive second-side angle $\theta_B$ orientation, or a positive angle alone (regardless as to being an average angle), is obtained when the respective first longitudinally-spaced side 32A and the second longitudinally-spaced side 32B are each increasingly inclined in the direction of tread rotation as each respective first longitudinally-spaced side and second longitudinally-spaced side extend in a direction of the tread thickness towards the outer, ground-engaging side of the tread. It is contemplated that, in providing a positive average angle, a portion of the first or second side may include a negative or positive angle so long as the average angle for each side is positive. It is appreciated that, for any configuration described herein, in particular embodiments, the average first-side angle may be different than the average second-side angle or, in other embodiments, the average first-side angle may be substantially equal to the average second-side angle.

In particular embodiments, with reference to FIG. 2, to quantify an overall positive inclination of the first and second longitudinally-spaced sides 32A, 32B, an average inclination angle comprising a combined average of the average first side-angle $\theta_A$ and the second side-angle $\theta_B$ for all of the one or more tread elements 28 along the first and second longitudinally-spaced sides is substantially greater than zero. Stated differently, the average inclination angle it is not the average of only the average first-side angle for all of the one or more tread elements, it is not the average second-side angle for all of the one or more tread elements, and it is not the average of both average first-side and second-side angles for each of the one or more tread elements. Instead, it is the combined average of the average first-side and second-side angles for the total first and second longitudinally-spaced sides for all of the one or more tread elements. It is appreciated that any one of the average first-side angle $\theta_A$ and the average second-side angle $\theta_B$ may be negative so long as the average inclination angle is positive and substantially greater than zero. Therefore, in particular embodiments, it is appreciated that both the average first-side angle $\theta_A$ and the average second-side angle $\theta_B$ are substantially greater than zero (0), for the substantial length of each first and second side, respectively. In particular embodiments, the average inclination angle is an average for all of the tread elements arranged long a tire tread.

In other embodiments, the one or more tread elements comprise intermediate tread elements 28i, such that the average inclination angle is an average of all of the one or more intermediate tread elements. In particular variations of such embodiments, the average inclination angle is an average of all intermediate tread elements of tread. In other variations, where the plurality of intermediate tread elements 28i are arranged into a plurality of intermediate ribs 30i, one or more intermediate ribs of the plurality of ribs may have a negative average inclination angle, so long as the average inclination angle for the plurality of intermediate tread elements is substantially greater than zero.

In yet further variations, for each respective intermediate rib, an average rib inclination angle comprising a combined average of the average first side-angle and the second side-angle for all of the one or more tread elements forming the respective intermediate rib along the first and second lateral sides is substantially greater than zero. In still another variation, where the one or more tread elements comprise a plurality of tread elements arranged into a plurality of ribs, which may comprise intermediate ribs and/or a pair of shoulder ribs, for each respective rib, an average rib inclination angle comprising a combined average of the average first side-angle and the second side-angle for all of the one or more tread elements forming the respective rib along the first and second lateral sides is substantially greater than zero. It is also contemplated that a rib may have an average inclination angle that is negative so long as the average of the average inclination angle for all ribs is substantially greater than zero. Of course, in another variation, the average inclination for each of the plurality of ribs is substantially greater than zero.

In particular embodiments, for any of the average first-side angle, the average second-side angle, and the average inclination angle, as described previously in different embodiments, substantially greater than zero means substantially equal to 5 degrees or more, 5 to 30 degrees, or 10 to 30 degrees. Other ranges of angles are also discussed herein, in other embodiments, that are also substantially greater than zero.

By employing tread elements where the average angle of the first-side angle and/or second-side angle is substantially greater than zero, or within the ranges discussed herein, a reduction in longitudinal driving forces is obtained, which in turn reduces slip and wear rate. And if the tire is less round, in particular embodiments, heel and toe wear is reduced or an increase avoided. Because the frequency and/or intensity in drive or acceleration may increase for any target driving style or situation, any average first-side angle and/or second-side angle may be increased or decreased as necessary to better reduce the slip for the targeted frequency or intensity of driving or acceleration. For example, when targeting driving styles where the frequency of acceleration is relatively moderate as compared to other driving styles, such as where the most frequently occurring acceleration occurred at 0.05 g, which is a ratio equaling Fx (the longitudinal force) divided by Fz (the force acting normal to the outer, ground-engaging side), that is, Fx/Fz), either or both of the average first-side angle and the average second-side angle, or the average angle as described previously in different embodiments, is substantially equal to 5 to 18 degrees. For driving styles being characterized as having a greater, or more elevated, frequency or intensity of acceleration, such as where the most frequently occurring acceleration occurred at 0.2 g, either or both of the average first-side angle and the average second-side angle, or the average angle as described previously in different embodiments, is substantially equal to 18 to 30 degrees. As suggested previously, it is appreciated that not all of the tread elements arranged on a tread comprise tread elements having the particular leading and/or trailing side inclinations as described above.

As noted above, the generation of longitudinal forces by a tire tread is reduced with increasing roundness of a tire footprint. With reference to FIG. 7, a tire footprint FP is shown, the footprint having a variable length $L_{FP}$, which decreases from a maximum $L_{FP,\,max}$ to a minimum $L_{FP,\,min}$ in a direction of the footprint width $W_{FP}$ (that is, in a widthwise direction) of the footprint, where the net decrease in length between maximum and minimum is identified as $\Delta_{FP}$. In particular embodiments, tire treads being characterized as having the average inclination angles described herein, for any one or more tread elements, are tires having footprints characterized as having a net decrease or change in length between maximum and minimum $\Delta_{FP}$, which, as expressed as a ratio change, is equal to or less than 1.20 or 120%, or, in yet other embodiments, 1.25 or 125% or less. Greater ratio changes may be acceptable in other embodiments. This ratio change is the ratio of the maximum length $L_{FP,\,max}$ to the minimum footprint length $L_{FP,\,min}$ (where the ratio change=$L_{FP,\,max}/L_{FP,\,min}$). A lateral profile for each of the leading edge LE and trailing edge TE of the footprint also has a drop in length corresponding to the decrease in footprint length $\Delta_{FP}$ as each extends in a direction of the footprint width $W_{FP}$, which, in the embodiment shown, is equal to approximately one half of the change in footprint length $\Delta_{FP}$. It is appreciated that a decrease in footprint length may vary as desired for different tires with different footprint shapes, as the footprint shown is provided for exemplary purposes only, as a tire may have a footprint of any desired shape and size. For a given width $W_{FP}$, the greater the change in length or drop, the rounder the profile.

Figure 8:
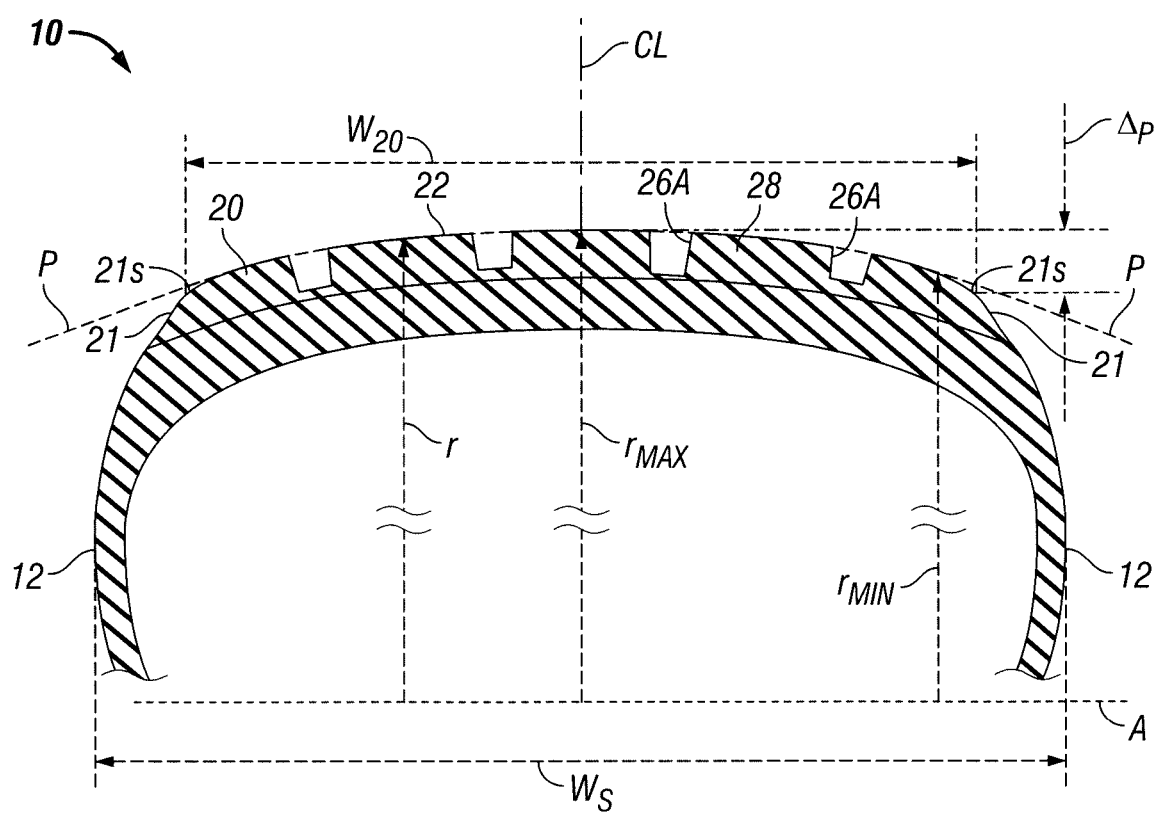
FIG. 8 is a sectional view of the tire shown in FIG. 1.

As noted, the roundness of a tire footprint may change due to a variety of factors. One primary factor is the lateral profile of the outer, ground-engaging side of the tread. With reference to FIG. 8, for example, it can be said that a molded or inflated lateral profile of the outer, ground-engaging side 22 is defined by a radius r extending from the outer, ground-engaging side to the rotational axis A of the tire, whereby for a lateral profile P, the radius r decreases from a maximum radius $r_{max}$ to a minimum radius $r_{min}$ as the profile extends laterally (that is, in a direction of the tread width $W_{20}$) from a widthwise tread centerline CL in each lateral direction of the tread. It is understood that the widthwise centerline CL extends along a plane extending in both a direction of the tread thickness $T_{20}$ and a direction of the tread length $L_{20}$ centered between first and second lateral sides of the tread, and which is normal to the rotational axis A of the tire when the tread forms a portion of the tire. Most often, the radius r is a maximum at the tread widthwise centerline CL, and is a minimum at each shoulder 21s or at each lateral side 21 of the tread, although different configurations of decreasing radius may be employed. The difference between the maximum $r_{max}$ and the minimum $r_{min}$ is commonly referred to as shoulder drop $\Delta_P$. For a given tread width $W_{20}$, the greater the shoulder drop, the rounder the profile, assuming all other factors remain constant. In lieu of the tread width $W_{20}$, the drop in lateral profile P may also be associated with a nominal section width $W_S$ of the tire, which is the nominal distance between opposing sidewalls 12. For example, in particular embodiments, the average angles described herein for average first-side angles and second-side angles are applicable to tire treads having a roundness factor substantially equal to or greater than 0.90, or equal to or greater than 0.92 or equal to or greater than 0.94 in other embodiments, where the roundness factor is equal to 1 minus the ratio of the shoulder drop $\Delta_P$ to a nominal section width $W_S$ of a tire (that is, the roundness factor is equal to $1-\Delta_P/W_S$), and where the shoulder drop is measured as the difference between the radius r taken at the tread centerline CL (or at a location of maximum radius $r_{max}$) and a location along the lateral tread profile P taken at 83% of a nominal section width $W_S$ of the tire. In particular embodiments, the shoulder drop $\Delta_P$ is equal to or less than 6 mm, such as for a tire having a nominal section width of a 205 mm. In other embodiments, the shoulder drop is between 80 and 95% of the nominal section width $W_s$, as understood by one of ordinary skill according to the Tire and Rim Association ("TRA") depending upon the series or aspect ratio of a particular tire. For these reasons, when tire footprints and lateral tread profiles are rounded, tread elements arranged closer to the shoulder generate less longitudinal forces than those arranged closer to the tread widthwise centerline. In fact, the longitudinal force generated by those tread elements arranged closer to the shoulder may generate negative longitudinal forces, which are braking longitudinal forces. Therefore, when using tread elements having first and second longitudinally-spaced sides characterized as having average first-side angles and the average first side angles substantially greater than zero, in the different variations described herein, the reduction of longitudinal forces may further increase the braking longitudinal forces generated by tread elements located closer to the shoulders, which may lead to increased slip and therefore increased heel and toe wear—even while reducing slip and heel and toe wear at or nearer the tread widthwise centerline.

Therefore, in particular embodiments, with reference to an exemplary tire treads shown in FIGS. 7 and 8, as the footprint FP or lateral profile P of the outer, ground-engaging side of a tire tread becomes more rounded, the average first/second side angle for a tire tread is reduced, to counteract or reduce the generation of any negative longitudinal forces at locations of reduced footprint length. The average first/second side angle is obtained by averaging of all average first-side angles $\theta_A$ (not shown, see FIG. 2) and all average second-side angles $\theta_B$ (not shown, see FIG. 2), together, for all tread elements on the tire tread. In particular instances, in lieu of taking the average of all tread elements on the tread, the average is only taken for all intermediate tread elements. In yet further variations, in lieu of taking the average of all tread elements, the average is taken for each rib, which may comprise only intermediate ribs or both intermediate and shoulder ribs By taking the average of each rib, it is appreciated that the inclination angles may vary along the rib, so long as a target average inclination angle is achieved for the rib.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A tire tread comprising:
   a length, a width, and a tread thickness, the tread thickness extending inward from an outer, ground-engaging side in a direction normal to both the width and the length of the tread;
   the width extending laterally in a direction transverse to the tread thickness and to the length of the tread, the width extending laterally between a first lateral side and a second lateral side of the tread;
   one or more tread elements, each of the one or more tread elements being arranged between a pair of discontinuities extending at least partially in the direction of the tread width, where each of the pair of discontinuities is a groove, where one of the pair of discontinuities is arranged adjacent to a first longitudinally-spaced side of the corresponding tread element and where the other of the pair of discontinuities is arranged adjacent to a second longitudinally-spaced side of the corresponding tread element such that the pair of discontinuities and the first and second longitudinally-spaced sides of the corresponding tread element are spaced-apart at least partially in the direction of the tread length to define a length of the corresponding tread element, the first longitudinally-spaced side being a leading side of the corresponding tread element and the second longitudinally-spaced side being a trailing side of the corresponding tread element, where the leading side is configured to enter a tire footprint before the trailing side;
   where the one or more tread elements include a plurality of intermediate tread elements arranged along the length of the tread and axially between a plurality of shoulder elements;
   where for each of the one or more tread elements, the first longitudinally-spaced side is oriented at an average first-side angle relative to the direction of the tread thickness and the second longitudinally-spaced side is oriented at an average second-side angle relative to the direction of the tread thickness, where the tread is configured to rotate in a direction of rotation of a tire, the direction of rotation comprising one of opposing directions of the tread length, such that a positive average first-side angle and a positive average second-side angle orientation is obtained when the respective first longitudinally-spaced side and the respective second longitudinally-spaced side are each increasingly inclined in the direction of rotation as each respective first longitudinally-spaced side and second longitudinally-spaced side extend in the direction of the tread thickness towards the outer, ground-engaging side of the tread;
   where for each of the one or more tread elements, both the average first-side angle and the average second-side angle are equal to 18 to 30 degrees; and
   where an average inclination angle comprising a combined average of the average first side-angle and the average second side-angle for all of the one or more tread elements along the first and second longitudinally-spaced sides is substantially greater than zero.

2. The tread of claim 1, where the one or more tread elements comprise all tread elements arranged along the tread.

3. The tread of claim 1, where the one or more tread elements further comprise a plurality of shoulder tread elements, the plurality of shoulder tread elements comprising one or more first shoulder tread elements arranged along the first lateral side of the tread and one or more second shoulder tread elements arranged along the second lateral side of the tread, the plurality of intermediate tread elements being arranged between the first and second shoulder tread elements.

4. The tread of claim 1, where the plurality of intermediate tread elements are arranged into a plurality of intermediate ribs each being formed of one or more of the plurality of intermediate tread elements, where, for each respective intermediate rib, an average rib inclination angle comprising a combined average of the average first side-angle and the average second side-angle for all of the one or more tread elements forming the respective intermediate rib along the first and second longitudinally-spaced sides is substantially greater than zero.

5. The tread of claim 4, where, for each of the intermediate ribs, the average rib inclination angle is substantially greater than zero.

6. The tread of claim 1, where the one or more tread elements comprise a plurality of tread elements arranged into a plurality of ribs, where, for each respective rib, an average rib inclination angle comprising a combined average of the average first side-angle and the average second side-angle for all of the one or more tread elements forming the respective rib along the first and second longitudinally-spaced sides is substantially greater than zero.

7. The tread of claim 6, where, for each of the ribs, the average rib inclination angle is substantially greater than zero.

8. The tread of claim 4, where the average rib inclination angle is substantially equal to 5 to 30 degrees.

9. The tread of claim 1, where the average first-side angle is different than the average second-side angle.

10. The tread of claim 1, where the tread forms a portion of the tire.

11. A method of reducing tread wear on a tire, the method comprising the steps of:
    providing a tread having:
      a length, a width, and a tread thickness, the tread thickness extending inward from an outer, ground-engaging side in a direction normal to both the width and the length of the tread;
      the width extending laterally in a direction transverse to the tread thickness and to the length of the tread, the width extending laterally between a first lateral side and a second lateral side of the tread;
      one or more tread elements, each of the one or more tread elements being arranged between a pair of discontinuities extending at least partially in the direction of the tread width, where each of the pair of discontinuities is a groove, where one of the pair of discontinuities is arranged adjacent to a first longitudinally-spaced side of the corresponding tread element and where the other of the pair of discontinuities is arranged adjacent to a second longitudinally-spaced side of the corresponding tread element such that the pair of discontinuities and the first and second longitudinally-spaced sides of the corresponding tread element are spaced-apart at least partially in the direction of the tread length to define a length of the corresponding tread element, the first longitudinally-spaced side being a leading side of the corresponding tread element and the second longitudinally-spaced side being a trailing side of the corresponding tread element, where the leading side is configured to enter a tire footprint before the trailing side;

where the one or more tread elements include a plurality of intermediate tread elements arranged along the length of the tread and axially between a plurality of shoulder elements;

where for each of the one or more tread elements, the first longitudinally-spaced side is oriented at an average first-side angle relative to the direction of the tread thickness and the second longitudinally-spaced side is oriented at an average second-side angle relative to the direction of the tread thickness, where the tread is configured to rotate in a direction of rotation of a tire, the direction of rotation comprising one of opposing directions of the tread length, such that a positive average first-side angle and a positive average second-side angle orientation is obtained when the respective first longitudinally-spaced side and the respective second longitudinally-spaced side are each increasingly inclined in the direction of rotation as each respective first longitudinally-spaced side and second longitudinally-spaced side extend in the direction of the tread thickness towards the outer, ground-engaging side of the tread;

where for each of the one or more tread elements, both the average first-side angle and the average second-side angle are equal to 18 to 30 degrees; and where an average inclination angle comprising a combined average of the average first side-angle and the average second side-angle for all of the one or more tread elements along the first and second longitudinally-spaced sides is substantially greater than zero.

12. The method of claim 11, where, for the tire having the tire footprint, the average inclination angle is lower than an average inclination angle that would otherwise be used for a tire having a less round footprint.

13. The method of claim 11, where the average inclination angle is lower than an average inclination angle that would otherwise be used for operating a tire under a greater driving torque.

14. The method of claim 12, where the lower average inclination angle is selected to reduce or avoid an increase in heel and toe wear along the tire tread.

* * * * *